United States Patent [19]

Mosko

[11] 4,309,706

[45] Jan. 5, 1982

[54] WIDEBAND DIRECTION-FINDING SYSTEM

[75] Inventor: Joseph A. Mosko, Ridgecrest, Calif.

[73] Assignee: The United States of America as represented by the Secretary of the Navy, Washington, D.C.

[21] Appl. No.: 524,427

[22] Filed: Nov. 14, 1974

[51] Int. Cl.$^3$ .............................................. H04B 7/00
[52] U.S. Cl. ................................ 343/100 R; 343/895
[58] Field of Search ............ 343/725, 729, 895, 100 R

[56] References Cited

U.S. PATENT DOCUMENTS 3,820,117 6/1974 Hall .................................... 343/895

*Primary Examiner*—Theodore M. Blum
*Attorney, Agent, or Firm*—Robert F. Beers; W. Thom Skeer

[57] ABSTRACT

A wideband direction finding system consisting of a spiral antenna and an array of towel bar antennas coupled together and driven from a single source and designed to operate over a wide band of frequencies as a circularly-polarized, two-channel mono-pulse system.

9 Claims, 5 Drawing Figures

| INPUT AT \ OUTPUT AT | $A_1$ | $A_2$ | $A_3$ | $A_4$ |
|---|---|---|---|---|
| Δ | $1\angle 0°$ | $1\angle 180°$ | $1\angle 0°$ | $1\angle 180°$ |
| Σ | $1\angle 0°$ | $1\angle 90°$ | $1\angle 180°$ | $1\angle 270°$ |

| INPUT AT \ OUTPUT AT | $A_1$ | $A_2$ | $A_3$ | $A_4$ |
|---|---|---|---|---|
| Δ+Σ | $2\angle 0°$ | $\sqrt{2}\angle 135°$ | 0 | $\sqrt{2}\angle -135°$ |
| Δ−Σ | 0 | $\sqrt{2}\angle -135°$ | $2\angle 0°$ | $\sqrt{2}\angle 135°$ |

WIDEBAND DIRECTION-FINDING SYSTEM

BACKGROUND OF THE INVENTION

1. Field of the Invention

The present invention comprises a direction finding antenna system adapted for use with a two-channel monopulse system. In such a system, the low frequency limit of operation is determined by the quality and gain of the difference (Δ) and sum (Σ) modes of the antenna system. This frequency may be so low that the antenna array diameter, D, is less than ⅔ wave length, i.e., $D<(2\lambda/3)$. The high frequency limit is determined by the size and tolerance of the center part of the antenna, in this case a spiral, so as to still have good gain and quality in the sum mode.

2. Description of the Prior Art

The prior art comprises conventional two-channel monopulse systems. One such system is a logarithmic spiral and array of towel bar antennas which are separately driven and not inter-connected in any way.

SUMMARY OF THE INVENTION

The present invention relates to a direction-finding system consisting of a spiral antenna and an array of towel bar antennas which are electrically inter-connected to be driven from a single source. The system is designed to operate over a wide range of frequencies as a circularly-polarized, two-channel monopulse system. Basically, the spiral antenna is mounted at the forward end of a missile and the towel bar antennas are mounted exteriorly on the skin at the forward end of the missile and suitably oriented with respect to the long axis of the body. The two antennas systems are inter-connected by suitable couplers and driven from a single source connected to the inner circumference of the spiral.

DESCRIPTION OF THE PREFERRED EMBODIMENT

Figure 1:
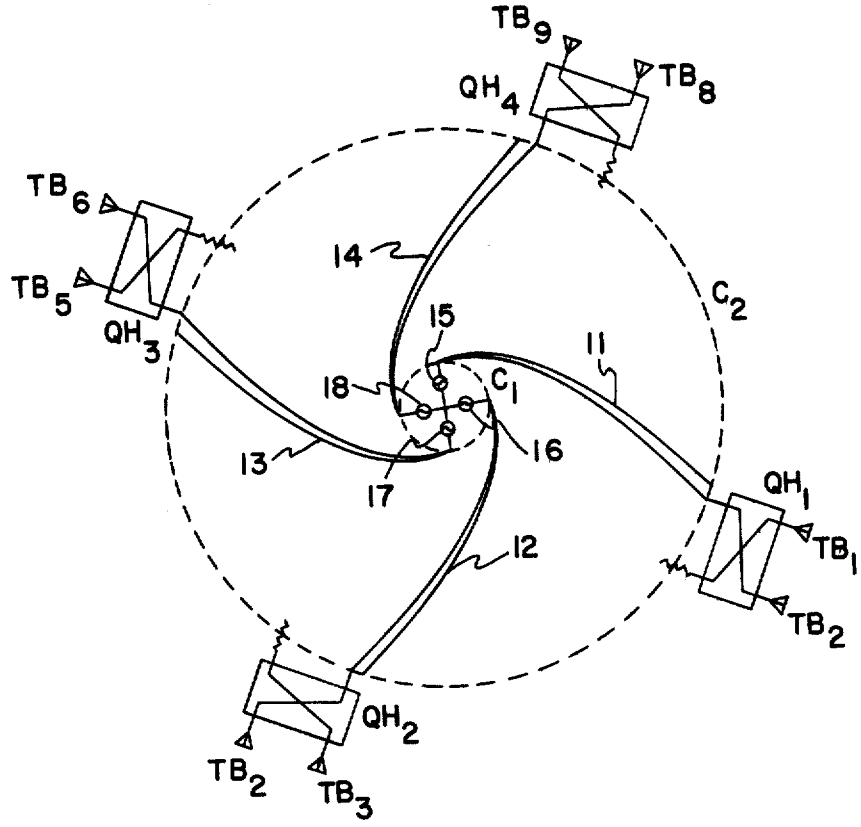
FIG. 1 is the antenna array schematic design.

FIG. 1 is the antenna array schematic of the invention consisting of a four arm-spiral having arms 11, 12, 13, and 14 and having an inner circumference $C_1$ and an outer circumference $C_2$. The arms 11 through 14 are driven at the inner circumference thereof as at 15 through 18 respectively.

The individual arms of the spiral terminate in respective input ports of quadrature couplers $QH_1$ through $QH_4$. Towel bars antennas $TB_1$ through $TB_8$ are coupled to the output ports of the respective quadrature couplers $QH_1$ through $QH_4$. Towel bar antennas $TB_1$ and $TB_2$ are associated with arm 11, towel bar antennas $TB_3$ and $TB_4$ with spiral arm 12, etc.

Figure 2:
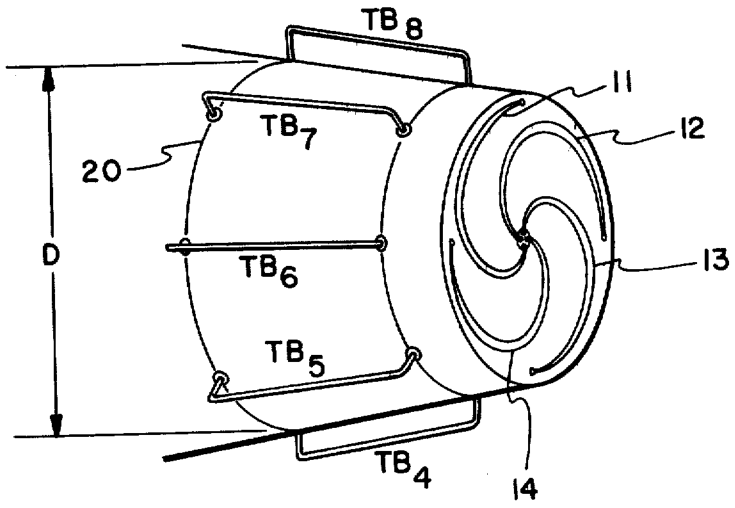
FIG. 2 is an external view of the antenna system.

The skin of the missile 20, in FIG. 2, acts as a ground plane for the antenna system.

Figure 3:
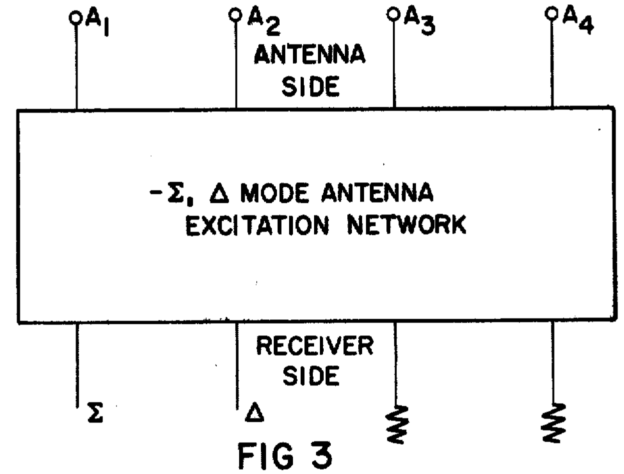
FIG. 3 is a block diagram of the excitation network showing inputs and outputs for a Σ, Δ system.
Figure 4:
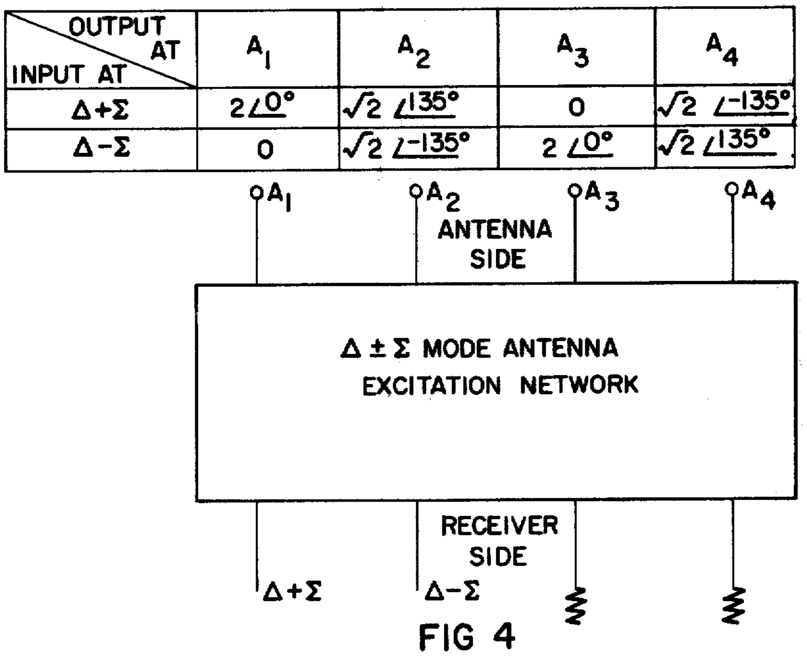
FIG. 4 is a block diagram of the excitation network and the inputs and outputs for a Δ±Σ system.

A suitable wideband feed network is used to excite the antenna system. It may be one which excites the four arms of the spiral either in the sum (Σ) or difference (Δ) modes as shown in FIG. 3, or it could be one which provides a Δ±Σ excitation such as shown in FIG. 4. Whichever type of network is used, it is connected to the center part of the spiral as shown in the schematic of FIG. 1.

At frequencies high enough such that D is greater than 2 $\lambda/\pi$, the DF system works as a conventional dual-mode spiral system. However, at frequencies such that D is less than 2 $\lambda/\pi$, a conventional system operates poorly because the spiral is not large enough to support the necessary Δ mode of radiation. At this point, the array of towel bar antennas comes into play.

At the frequencies when the towel bar array is excited i.e., when the spiral is not physically large enough to radiate efficiently, the sum (Σ) mode may still be primarily generated from the spiral. It is known that an array of eight (8) towel bar antennas as illustrated in the present invention and located close to the edge of the four-arm spiral system does have a good Δ mode radiation capability.

In the present system, a set of four (4) 3-dB quadrature hybrids is connected to the ends of the spiral antenna system as shown schematically in FIG. 1. The coupler output ports are also symmetrically connected to the inputs of the towel bar array. For the low frequency Δ mode excitation from the feed network, since the spiral is not large enough to radiate appreciable amounts of energy, there should be a considerable amount of energy left to excite the towel bar array through the quadrature couplers $QH_1$ through $QH_4$. The eight elements of the towel bar array are thereby excited proportional to $$1e^{2j2\pi/n}$$

, where n=1,2,3 . . . ,8 which is recognized to be the ideal Δ mode for any symmetric eight element array.

At very low frequencies, the towel bar array also will not give a satisfactory Δ pattern. This is because, at sufficiently long wave lengths, a cylinder can't efficiently support the necessary surface current, $e^{2j2\pi\Phi}$ variation, to radiate in the Δ mode. Before this occurs however, the towel bar antennas may be required to also provide some contribution to the sum mode radiation pattern. This they can do quite well. Note that the sum mode excitation to the quadrature couplers is proportional to 1 $e^{j2\pi/n}$ where n=1,2,3,4, which results in a relative excitation of the towel bar antennas as proportional to {1/0°, 1/90°, 1/90°, 1/180°, 1/180°, 1/270°, 1/270°, 1/360°} which still is an effective sum mode excitation on the cylinder or missile skin section. More precisely, the excitation is Σ mode and mode 3 of opposite circular polarization which is basically beyond cut-off for radiation.

The towel bar antenna is a frequency-dependent antenna and as such has considerable input impedance variation with frequency. Some of this variation, as viewed from the spiral arms, is attenuated by the action of the termination of the 3-dB quadrature hybrid which is located between the spiral arms and the frequency-dependent towel bar antennas. Also, in order to have a satisfactory combined Δ and Σ mode excitation, the phase rotation of the Δ mode of the towel bar array must be matched to the Σ mode phase rotation of the spiral. This can be done with transmission lines (dispersive or non dispersive) which connect all of the ends of the spiral arms and the inputs to the quadrature couplers.

The same principals apply to two-arm spirals for the Σ mode radiation pattern. Naturally, now only two 3-dB quadrature hybrids and four towel bars would be required. Furthermore, if the primary radiator is a six or eight-arm spiral, appropriate numbers of complementary couplers and towel bars will be used.

A number of equivalents may be used in the system. For instance, the 3-dB quadrature hybrids may be replaced by simple power dividers and differential phase shifters. One may use a logarithmic, Archimedean, or variable growth rate type spiral depending on how the reference plane rotation compensation for the DF system is to be accomplished. Although the quadrature couplers should behave as 3-dB quadrature couplers in the lower frequency range, it may be advantageous to have them become complementary couplers in the transition frequency region, $D \simeq 2\lambda/\pi$, to accomplish the best and most stable Δ mode radiation pattern throughout the total frequency range. In addition, the spirals may be loaded electrically.

Figure 5:
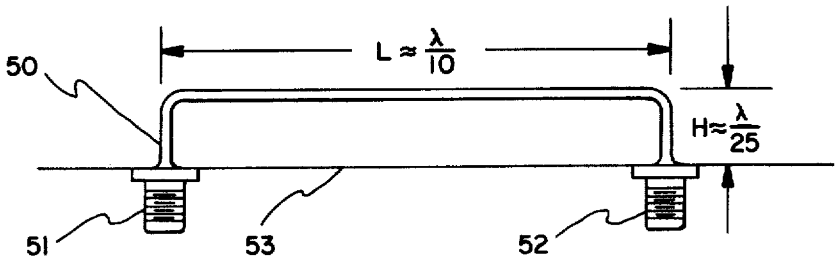
FIG. 5 is a typical towel bar antenna.

A typical towel bar antenna is shown in FIG. 5 and comprises the towel bar section 50, an input terminal 51 and a suitable termination 52. The terminals are shown as being threaded for attaching radio frequency cables and terminations; also shown is the exterior surface or skin of the missile with which they are associated. The input terminal 51 is connected to the quadrature coupler and the output terminal 52 is terminated in a suitable impedance. It is to be understood that the towel bar antenna is suitably insulated from the skin of the missile or ground plane 53.

It is also to be understood that in operation, the complete antenna array would be covered by a suitable radome.

Further, the towel bars could be placed inside the skin of the missile on a suitable mounting means rather than on the exterior of the missile, as shown.

I claim:

1. A wideband direction-finding antenna system comprising;

a substantially cylindrical body having end portions;

a multi-arm spiral antenna mounted on one end portion of said body;

each arm of said multi-arm spiral having one end terminating at an inner circumference and another end terminating at an outer circumference;

coupling means associated with each arm of said multi-arm spiral and connected to the end of each arm terminating at the outer circumference of the spiral;

said coupling means each having at least one input port and at least two output ports to provide a power split and predetermined phase relationship at said output ports;

said at least one input port being connected to the end of the associated arm at the outer circumference;

at least one pair of towel bar antennas connected to said at least two output ports of each of said coupling means associated with each arm of said multi-arm spiral;

so that said antenna system is operative to provide combined Σ and Δ modes across a wide range of frequencies.

2. A wideband direction-finding system as set forth in claim 1 wherein;

said coupling means is a 3-db quadrature hybrid.

3. A wideband direction-finding antenna system as set forth in claim 1 wherein;

said individual towel bars in the array of towel bar antennas are mounted with the long axis of the towel bar substantially parallel to the axis of the cylindrical body.

4. A wideband direction-finding antenna system as set forth in claim 1 wherein;

the individual towel bar antennas of the array of towel bar antennas are oriented with the long axis of the individual towel bar antennas non-parallel in a preferential direction with respect to the long axis of the substantially cylindrical body.

5. A wideband direction-finding antenna system as set forth in claim 1 and further including;

antenna feed means operately coupled to the end of said spiral antenna terminating at the inner-circumference thereof.

6. A wideband direction-finding system as set forth in claim 1 wherein;

said spiral antenna is a logarithmic spiral.

7. A wideband direction-finding antenna system as set forth in claim 1 wherein;

said multi-arm spiral antenna is a Archimedian spiral.

8. A wideband direction-finding antenna system as set forth in claim 1 wherein;

said multi-arm spiral antenna is a variable growth rate spiral.

9. A wideband direction-finding antenna system as set forth in claim 1 wherein;

the towel bar antennas are mounted on the outer periphery of said cylindrical body.

* * * * *